United States Patent
Takahashi et al.

(10) Patent No.: US 9,163,305 B2
(45) Date of Patent: Oct. 20, 2015

(54) CONTINUOUS ANNEALING METHOD AND A MANUFACTURING METHOD OF HOT-DIP GALVANIZED STEEL STRIPS

(75) Inventors: Hideyuki Takahashi, Chiba (JP); Nobuyuki Sato, Chiba (JP); Kazuki Nakazato, Chiba (JP); Masato Iri, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 315 days.

(21) Appl. No.: 13/994,366

(22) PCT Filed: Dec. 13, 2011

(86) PCT No.: PCT/JP2011/079277
§ 371 (c)(1),
(2), (4) Date: Jun. 14, 2013

(87) PCT Pub. No.: WO2012/081719
PCT Pub. Date: Jun. 21, 2012

(65) Prior Publication Data
US 2013/0273251 A1    Oct. 17, 2013

(30) Foreign Application Priority Data
Dec. 17, 2010    (JP) .................................. 2010-281406

(51) Int. Cl.
*C23C 2/02*    (2006.01)
*C21D 1/74*    (2006.01)
(Continued)

(52) U.S. Cl.
CPC .................. *C23C 2/02* (2013.01); *B32B 15/013* (2013.01); *C21D 1/74* (2013.01); *C21D 1/76* (2013.01);
(Continued)

(58) Field of Classification Search
CPC .............. C23C 2/02; C23C 2/26; C23C 2/28; C23C 2/40
See application file for complete search history.

(56) References Cited

U.S. PATENT DOCUMENTS

| | | | | |
|---|---|---|---|---|
| 6,224,692 | B1 * | 5/2001 | Cantacuzene | 148/533 |
| 2007/0259203 | A1 * | 11/2007 | Buecher et al. | 428/687 |
| 2009/0123651 | A1 | 5/2009 | Okada | |

FOREIGN PATENT DOCUMENTS

| | | | |
|---|---|---|---|
| JP | 7-138652 A | 5/1995 | |
| JP | 8-109417 A | 4/1996 | |

(Continued)

OTHER PUBLICATIONS

International Search Report (ISR) dated Mar. 19, 2012 issued in International Application No. PCT/JP2011/079277.

(Continued)

*Primary Examiner* — David Turocy
(74) *Attorney, Agent, or Firm* — Holts, Holtz, Goodman & Chick PC (57) ABSTRACT

An annealing and manufacturing method of hot-dip galvanized steel strips includes suppression of oxide formation of elements in the steel strips. An annealing furnace includes a heating zone, a soaking zone, and a cooling zone in which a portion of gas is introduced to decrease the gas dew point. A gas suction rate Qo1 in a portion of the cooling zone, a gas suction rate Qo2 in an upper portion and a gas feed rate Qi2 in a lower portion of the soaking zone, a gas feed rate Qi1 in a connection part between the soaking and cooling zones, an atmosphere gas supply rate Qf1 into the cooling zone and its subsequent zone, an atmosphere gas supply rate Qf2 into the soaking zone, an internal volume Vs of the soaking zone, and an average furnace temperature Ts of the soaking zone satisfy relationships including $0.3 \times Qf1 < Qo1$.

19 Claims, 3 Drawing Sheets

(51) Int. Cl.

| | | |
|---|---|---|
| *C21D 1/76* | (2006.01) | |
| *C21D 9/56* | (2006.01) | |
| *C23C 2/28* | (2006.01) | |
| *F27B 9/28* | (2006.01) | |
| *F27D 7/06* | (2006.01) | |
| *B32B 15/01* | (2006.01) | |
| *C22C 38/02* | (2006.01) | |
| *C22C 38/04* | (2006.01) | |
| *C22C 38/06* | (2006.01) | |

(52) U.S. Cl.
CPC . *C21D 9/56* (2013.01); *C22C 38/02* (2013.01); *C22C 38/04* (2013.01); *C22C 38/06* (2013.01); *C23C 2/28* (2013.01); *F27B 9/28* (2013.01); *F27D 7/06* (2013.01)

(56) References Cited

FOREIGN PATENT DOCUMENTS

| | | | |
|---|---|---|---|
| JP | 2567130 B2 | | 12/1996 |
| JP | 2567140 B2 | | 12/1996 |
| JP | 09324210 A | * | 12/1997 |
| JP | 10-46237 A | | 2/1998 |
| JP | 10176225 A | | 6/1998 |
| JP | 2002206117 A | | 7/2002 |
| JP | 2005-171294 A | | 6/2005 |
| WO | WO 2007/043273 A1 | | 4/2007 |

OTHER PUBLICATIONS

Extended European Search Report dated Sep. 22, 2014 issued in counterpart European Application No. 11848237.1.

* cited by examiner

FIG. 1

⊗ DEW-POINT MEASUREMENT POSITIONS

CONTINUOUS ANNEALING METHOD AND A MANUFACTURING METHOD OF HOT-DIP GALVANIZED STEEL STRIPS

TECHNICAL FIELD

The present invention relates to a continuous annealing method and a hot dip galvanizing method for steel strips.

BACKGROUND ART

In a continuous annealing furnace for annealing steel strips, for example, in the startup of the furnace after the furnace is opened in the air or in the case where the air enters the atmosphere in the furnace, to reduce the water content and oxygen concentration in the furnace, the following method is conventionally widely performed: the temperature in the furnace is increased to evaporate water in the furnace and a non-oxidizing gas such as an inert gas is subsequently supplied into the furnace as a gas that replaces the atmosphere in the furnace and the gas in the furnace is simultaneously removed to thereby replace the atmosphere in the furnace with the non-oxidizing gas.

However, this conventional method requires a long time to decrease the water content and oxygen concentration of the atmosphere in the furnace to certain levels suitable for the normal operation. Since the furnace cannot be operated until the certain levels are achieved, the productivity is considerably decreased, which is a problem.

In recent years, in the fields of automobiles, household electrical appliances, construction materials, and the like, demands for high-tensile steel that can contribute to, for example, reduction in the weight of structures have been increasing. According to high-tensile steel techniques, when Si is added to steel, high-tensile steel strips having a high hole expansion ratio can be produced; and when steel is made to contain Si or Al, retained γ tends to be formed and steel strips having a high ductility can be provided.

However, when high-strength cold-rolled steel strips contain elements susceptible to oxidation such as Si and Mn, these elements susceptible to oxidation are concentrated in the surfaces of the steel strips during annealing to form oxides of Si, Mn, and the like. As a result, the steel strips have a poor appearance or the steel strips are not sufficiently treated with a chemical conversion treatment such as a phosphate treatment, which is problematic.

In the case of hot dip galvanized steel strips, when the steel strips contain elements susceptible to oxidation such as Si and Mn, these elements susceptible to oxidation are concentrated in the surfaces of the steel strips during annealing to form oxides of Si, Mn, and the like. As a result, the coatability of the steel strips is degraded and uncoated defects are generated; or the alloying rate in the galvannealing after galvanizing is decreased, which is problematic. In particular, as for Si, oxide films composed of $SiO_2$ formed on the surfaces of steel strips considerably degrade the wettability of the steel strips with the hot dip coating metal; and $SiO_2$ oxide films inhibit diffusion between the base metal and the coated metal in the galvannealing. Thus, the problems that the coatability is degraded and the galvannealing is not properly performed tend to be particularly caused.

To avoid these problems, a method of controlling the oxygen potential of the atmosphere in annealing may be employed.

As a method of increasing the oxygen potential, for example, Patent Literature 1 discloses a method of controlling the dew point in a region extending from the latter portion of the heating zone to the soaking zone to be a high dew point of −30° C. or more. This method is advantageous in that it provides a certain level of effects and the dew point is easily controlled to be high on an industrial scale. However, the method has a disadvantage that steels (for example, Ti-based IF steel) for which it is desirable to avoid high dew points are not easily produced. This is because it takes a very long time to make an annealing atmosphere that has been made to have a high dew point have a low dew point. In addition, since this method makes the atmosphere in the furnace be an oxidizing atmosphere, a mistake in the controlling causes a problem that oxide adheres to rolls in the furnace and pickup defects are generated and a problem that the furnace walls are damaged.

Alternatively, a method of making the oxygen potential low may be employed. However, Si, Mn, and the like are very susceptible to oxidation. Accordingly, in large continuous annealing furnaces installed in CGL (continuous galvanizing line) and CAL (continuous annealing line), it has been considered to be very difficult to stably maintain an atmosphere having a low dew point of −40° C. or less in which oxidation of Si, Mn, and the like is suppressed.

Techniques of efficiently obtaining an annealing atmosphere having a low dew point are disclosed in, for example, Patent Literatures 2 and 3. However, these techniques are intended to be used for single-pass vertical furnaces, which are relatively small furnaces. These techniques are not intended to be used for multi-pass vertical furnaces for CGL and CAL and hence the probability that the dew point is not efficiently decreased by the techniques is very high.

CITATION LIST

Patent Literature

[PTL 1] International Publication No. WO2007/043273
[PTL 2] Japanese Patent No. 2567140
[PTL 3] Japanese Patent No. 2567130

SUMMARY OF INVENTION

Technical Problem

An object of the present invention is to provide a continuous annealing method for steel strips in which, before a normal operation of continuously heat-treating steel strips is performed or when the water concentration and/or oxygen concentration of the atmosphere in the furnace increases during the normal operation, the dew point of the atmosphere in the furnace can be rapidly decreased to a level suitable for the normal operation. Another object of the present invention is to provide a continuous annealing method for steel strips, the method being suitable for annealing steel strips containing elements susceptible to oxidation such as Si, in which an atmosphere having a low dew point that is less likely to cause the problems of generation of pickup defects and damage on furnace walls can be stably obtained, and formation of oxides of elements susceptible to oxidation such as Si and Mn contained in the steel of steel strips due to concentration of the elements susceptible to oxidation such as Si and Mn in the surfaces of the steel strips during annealing is suppressed. Another object of the present invention is to provide a hot dip galvanizing method for steel strips in which steel strips are subjected to continuous annealing and then to hot dip galvanizing, and, optionally, after the hot dip galvanizing to form a zinc coating, to galvannealing.

Solution to Problem

The inventors of the present invention performed, for example, measurements of the dew-point distribution in a multi-pass large vertical furnace and flow analyses based on the measurements. As a result, the inventors of the present invention have found that water vapor ($H_2O$) has a lower specific gravity than $N_2$ gas constituting a large portion of the atmosphere and hence the upper portion of a multi-pass vertical annealing furnace tends to have a high dew point; and, by sucking the gas in the upper portion of the furnace so as to be introduced into a refiner including deoxidation device and a dehumidification device to thereby decrease the dew point of the gas through removal of oxygen and water and by returning the gas whose dew point has been decreased into specific regions in the furnace, the upper portion of the furnace can be prevented from having a high dew point and the dew point of the atmosphere in the furnace can be decreased to a certain level suitable for the normal operation in a short period. In addition, the inventors of the present invention have found that a furnace atmosphere having a low dew point in which the problems of generation of pickup defects and damage on furnace walls are less likely to be caused and formation of oxides of elements susceptible to oxidation such as Si and Mn contained in the steel of steel strips due to concentration of the elements susceptible to oxidation such as Si and Mn in the surfaces of the steel strips during annealing is suppressed can be stably obtained.

The objects are achieved by the following present invention.

[1] A continuous annealing method for steel strips, comprising annealing steel strips with a vertical annealing furnace in which a heating zone for heating the steel strips while the steel strips are being transported upward and downward, a soaking zone, and a cooling zone are disposed in this order; an atmosphere gas is supplied from outside of the furnace into the furnace; a gas in the furnace is discharged from a steel-strip entrance in a lower portion of the heating zone; a portion of the gas in the furnace is sucked and introduced into a refiner that is disposed outside of the furnace and includes a deoxidation device and a dehumidification device to decrease a dew point of the gas through removal of oxygen and water from the gas; and the gas whose dew point has been decreased is returned into the furnace, wherein the heating zone and the soaking zone are in communication with each other through an upper portion of the furnace; except for a communication region in the upper portion of the furnace, a partition wall is disposed so as to separate an atmosphere of the heating zone from an atmosphere of the soaking zone; a connection part between the soaking zone and the cooling zone is disposed in an upper portion of the furnace; suction ports through which the gas in the furnace is sucked so as to be introduced into the refiner are disposed in a portion of the cooling zone near the connection part between the soaking zone and the cooling zone and in an upper portion of the soaking zone; feed ports through which the gas whose dew point has been decreased with the refiner is fed to the furnace are disposed at least in the connection part between the soaking zone and the cooling zone and in a lower portion of the soaking zone; and a gas suction rate $Qo1$ ($Nm^3/hr$) in the portion of the cooling zone near the connection part between the soaking zone and the cooling zone, a gas suction rate $Qo2$ ($Nm^3/hr$) in the upper portion of the soaking zone, a gas feed rate $Qi1$ ($Nm^3/hr$) in the connection part between the soaking zone and the cooling zone, a gas feed rate $Qi2$ ($Nm^3/hr$) in the lower portion of the soaking zone, a supply rate $Qf1$ ($Nm^3/hr$) of the atmosphere gas from outside of the furnace into the cooling zone and a zone subsequent to the cooling zone, a supply rate $Qf2$ ($Nm^3/hr$) of the atmosphere gas from outside of the furnace into the soaking zone, an internal volume $Vs$ ($m^3$) of the soaking zone, and an average furnace temperature $Ts$ (° C.) of the soaking zone satisfy relationships represented by formulae (1) to (4) below $$0.3 \times Qf1 < Qo1 \tag{1}$$

$$0.5 \times (Qf2+Qi2+Qf1+Qi1-Qo1) < Qo2 < Qf2+Qi2+Qf1+Qi1-Qo1 \tag{2}$$

$$Qi1 > Qo1 - 0.8 \times Qf1 \tag{3}$$

$$Qi2 > 5 \times Vs \times 273/(273+Ts) \tag{4}$$

[2] The continuous annealing method for steel strips according to [1], wherein the gas suction rate $Qo1$ ($Nm^3/hr$) in the portion of the cooling zone near the connection part between the soaking zone and the cooling zone, the gas feed rate $Qi1$ ($Nm^3/hr$) in the connection part between the soaking zone and the cooling zone, the gas feed rate $Qi2$ ($Nm^3/hr$) in the lower portion of the soaking zone, the supply rate $Qf1$ ($Nm^3/hr$) of the atmosphere gas from outside of the furnace into the cooling zone and the zone subsequent to the cooling zone, the internal volume $Vs$ ($m^3$) of the soaking zone, and the average furnace temperature $Ts$ (° C.) of the soaking zone satisfy relationships represented by formulae (5), (6), and (7) below instead of the formulae (1), (3), and (4)

$$0.5 \times Qf1 < Qo1 \tag{5}$$

$$Qi1 > Qo1 - 0.5 \times Qf1 \tag{6}$$

$$Qi2 > 6 \times Vs \times 273/(273+Ts) \tag{7}$$

[3] The continuous annealing method for steel strips according to [2], wherein another feed port through which the gas whose dew point has been decreased with the refiner is fed to the furnace is disposed in an upper portion of the heating zone; and a gas feed rate $Qi3$ ($Nm^3/hr$) in the upper portion of the heating zone, an internal volume $Vh$ ($m^3$) of the heating zone, and an average furnace temperature $Th$ (° C.) of the heating zone satisfy a relationship represented by a formula (8) below $$Qi3 > 0.35 \times Vh \times 273/(273+Th) \tag{8}$$

[4] The continuous annealing method for steel strips according to [2] or [3], wherein the gas suction rate $Qo1$ ($Nm^3/hr$) in the portion of the cooling zone near the connection part between the soaking zone and the cooling zone, the gas feed rate $Qi2$ ($Nm^3/hr$) in the lower portion of the soaking zone, the supply rate $Qf1$ ($Nm^3/hr$) of the atmosphere gas from outside of the furnace into the cooling zone and the zone subsequent to the cooling zone, the internal volume $Vs$ ($m^3$) of the soaking zone, and the average furnace temperature $Ts$ (° C.) of the soaking zone satisfy relationships represented by formulae (9) and (10) below instead of the formulae (5) and (7)

$$0.7 \times Qf1 < Qo1 \tag{9}$$

$$Qi2 > 7 \times Vs \times 273/(273+Ts) \tag{10}$$

[5] The continuous annealing method for steel strips according to any one of [1] to [4], wherein the steel strips are transported through the cooling zone with a single pass.

[6] A hot dip galvanizing method for steel strips, comprising performing continuous annealing by the method according to any one of [1] to [5], and subsequently performing hot dip galvanizing.

[7] The hot dip galvanizing method for steel strips according to [6], further comprising, after the hot dip galvanizing, galvannealing the hot dip galvanized steel strip.

Advantageous Effects of Invention

According to the present invention, before a normal operation of continuously heat-treating steel strips is performed or when the water concentration and/or oxygen concentration of the atmosphere in the furnace increases during the normal operation, the time over which the dew point of the atmosphere in the furnace is decreased to −30° C. or less at which steel strips can be stably produced by decreasing the water concentration and/or oxygen concentration of the atmosphere in the furnace is shortened to thereby suppress degradation of productivity.

According to the present invention, a furnace atmosphere having a low dew point of −40° C. or less in which the problems of generation of pickup defects and damage on furnace walls are less likely to be caused and formation of oxides of elements susceptible to oxidation such as Si and Mn contained in the steel of steel strips due to concentration of the elements susceptible to oxidation such as Si and Mn in the surfaces of steel strips during annealing is suppressed can be stably obtained. According to the present invention, steels such as Ti-based IF steel for which it is desirable to avoid high dew points can be easily produced.

DESCRIPTION OF EMBODIMENTS

A continuous galvanizing line for steel strips includes an annealing furnace located upstream of a coating bath. In general, the annealing furnace includes, from an upstream portion to a downstream portion of the furnace, a heating zone, a soaking zone, and a cooling zone in this order. The annealing furnace is connected to the coating bath via a snout. A furnace region from the heating zone to the snout is maintained so as to have a reducing atmosphere gas or a non-oxidizing atmosphere. In the heating zone and the soaking zone, radiant tubes are used as a heater to indirectly heat steel strips. The reducing atmosphere gas is generally $H_2$-$N_2$ gas and is introduced into appropriate positions in the furnace region from the heating zone to the snout. In the line, steel strips are heat-annealed at a predetermined temperature in the heating zone and the soaking zone, then cooled in the cooling zone, moved through the snout, immersed in the coating bath to be hot dip galvanized, and optionally subjected to galvannealing.

In the continuous galvanizing line, since the furnace is connected to the coating bath via the snout, the gas introduced into the furnace is discharged from the entrance of the furnace except for unavoidable gas discharge such as leakage from the furnace body; the gas in the furnace flows in a direction opposite to a direction in which steel strips are moved, that is, from a downstream portion to an upstream portion of the furnace. Water vapor ($H_2O$) has a lower specific gravity than $N_2$ gas constituting a large portion of the atmosphere and hence an upper portion of a multi-pass vertical annealing furnace tends to have a high dew point.

To efficiently decrease the dew point, it is important that the region whose dew point needs to be decreased is limited, specifically, stagnations of the atmosphere gas in the furnace (stagnations of the atmosphere gas in the upper portion, middle portion, and lower portion of the furnace) are prevented and the upper portion of the furnace is prevented from having a high dew point. In addition, it is important to identify the sources of water, which increases the dew point. Water is generated from, for example, furnace walls, steel strips, entry of the air from the outside through the entrance of the furnace, and entry of water from the cooling zone and the snout.

The influence of the dew point on the coatability increases with the temperature of steel strips and, in particular, the influence becomes great when the temperature of steel strips is 700° C. or more in which the steel strips have a high reactivity with oxygen. The largest factor that increases the dew point is seeping of water from furnace walls, which often occurs in a region at a high furnace temperature. In the latter half of the heating zone and the soaking zone, the temperature of steel strips is 700° C. or more and hence the dew point of the atmosphere in the furnace influences the coatability. The temperature of steel strips is higher in the soaking zone than in the latter half of the heating zone and hence the influence of the dew point of the atmosphere in the furnace on the coatability is more greatly exhibited. Accordingly, in the soaking zone, it is necessary to prevent stagnation of the atmosphere gas and to decrease the dew point of the atmosphere. In addition, also in the latter half of the heating zone, it is preferable to prevent stagnation of the atmosphere gas and to decrease the dew point of the atmosphere.

Specifically, before a normal operation of continuously heat-treating steel strips is performed or when the water concentration and/or oxygen concentration of the atmosphere in the furnace increases during the normal operation, the time over which the dew point of the atmosphere in the furnace is decreased to −30° C. or less at which steel strips can be stably produced by decreasing the water concentration and/or oxygen concentration of the atmosphere in the furnace needs to be shortened. In the soaking zone, it is necessary to prevent stagnation of the atmosphere gas and to decrease the dew point of the atmosphere to −40° C. or less in which oxidation of Si, Mn, and the like is markedly suppressed. In view of the coatability, the lower the dew point is, the more preferable it is. The dew point in the soaking zone is preferably decreased to −45° C. or less. More preferably, the dew point in the latter half of the heating zone and the soaking zone is preferably decreased to −45° C. or less, still more preferably −50° C. or less.

Steel strips having been made to have a high temperature in the heating zone are introduced into the cooling zone and cooled to 700° C. or less in a short period. Accordingly, the time over which steel strips are in the temperature range of 700° C. or more is relatively short and the degree to which steel strips are oxidized in the cooling zone is small. Thus, the necessity of decreasing the dew point in the former half of the cooling zone is small, compared with in the soaking zone and the latter half of the heating zone.

In the present invention, to decrease the dew point of an atmosphere gas, a portion of the atmosphere gas in the furnace is introduced into a refiner that includes a deoxidation device and a dehumidification device and is disposed outside the furnace so as to decrease the dew point of the gas through removal of oxygen and water from the gas, and the gas whose dew point has been decreased is returned to the furnace. To return the gas whose dew point has been decreased into the furnace, suction ports through which the gas in the furnace is sucked so as to be introduced into the refiner and feed ports through which the gas whose dew point has been decreased is returned from the refiner into the furnace are disposed in the following manner 1) to 4).

1) In the lower portion of the soaking zone, which is far from the gas outlet of the soaking zone, the atmosphere gas particularly tends to stagnate. To suppress stagnation of the atmosphere gas in the lower portion of the soaking zone, a feed port through which the gas from the refiner is returned into the furnace is disposed in the lower portion of the soaking zone.

2) In the upper portion of the cooling zone, entry of a gas having a high dew point from the coating pot occurs. In addition, to suppress entry of the air from the outside through the cooling zone and the snout, stagnation of the atmosphere gas needs to be suppressed in the upper portion of the cooling zone. Accordingly, a suction port through which the gas is sucked so as to be introduced into the refiner is disposed in the upper portion of the cooling zone. Stagnation of the gas in the upper portion of the cooling zone can be suppressed by the suction of the gas. However, the furnace pressure near the upper portion of the cooling zone may be a negative pressure and hence a feed port through which the gas from the refiner is returned is disposed in a connection part between the soaking zone and the cooling zone.

3) The upper portion of the soaking zone has a high furnace temperature and is far from the furnace gas supply portion and the gas outlet of the soaking zone and hence tends to have a high dew point. In addition, in view of the temperature of steel strips and the residence time of steel strips, the necessity of decreasing the dew point in the upper portion of the soaking zone is the greatest. This is most effectively achieved by sucking the atmosphere gas from the upper portion of the soaking zone and hence a suction port through which the gas is sucked so as to be introduced into the refiner is disposed in the upper portion of the soaking zone. The soaking zone tends to have a higher dew point than the other positions and flows also tend to stagnate therein. Accordingly, aggressive measures need to be taken and the flow rate of the gas introduced into the refiner and the flow rate of the gas returned from the refiner need to be higher than those in the other positions.

4) In the upper portion of the heating zone, the gas in the furnace scarcely flows due to the structure and hence this is the position where the atmosphere gas is the most likely to stagnate. The stagnant gas in the position tends to have a high dew point and hence a feed port through which the gas from the refiner is returned is disposed in the upper portion of the heating zone.

The present invention is based on such viewpoints.

Hereinafter, an embodiment of the present invention will be described with reference to FIGS. 1 and 2.

Figure 1:
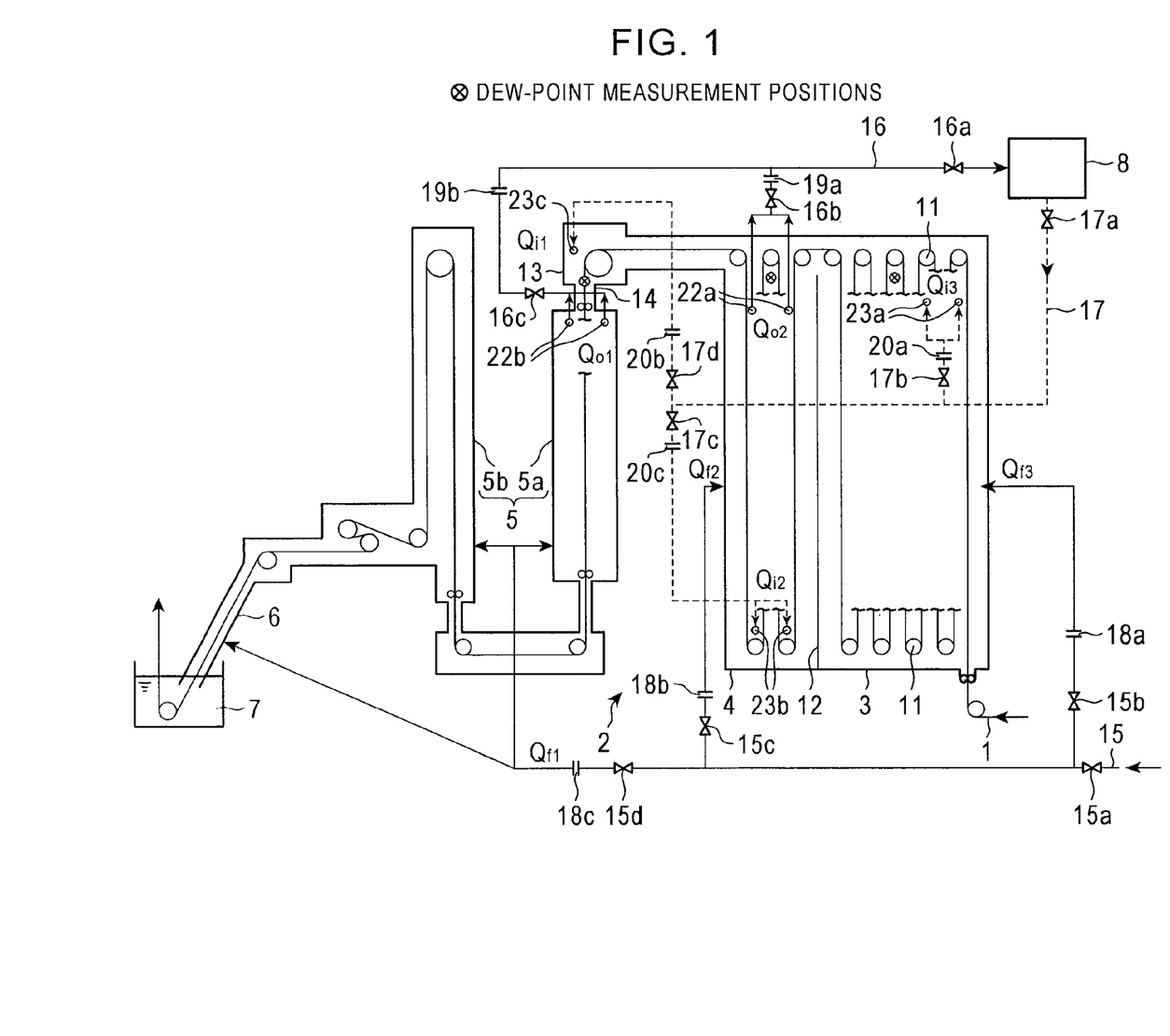
FIG. 1 illustrates an example of the configuration diagram of a continuous galvanizing line for steel strips used in an embodiment of the present invention.

FIG. 1 illustrates an example of the configuration diagram of a continuous galvanizing line for steel strips that includes a vertical annealing furnace and is used in an embodiment of the present invention. In FIG. 1, the reference sign 1 denotes steel strips; the reference sign 2 denotes the annealing furnace including, in the direction in which the steel strips are moved, a heating zone 3, a soaking zone 4, and a cooling zone 5 in this order. In the heating zone 3 and the soaking zone 4, a plurality of hearth rolls 11 are disposed in the upper and lower portions so as to constitute a plurality of passes in which the steel strips 1 are transported a plurality of times upward and downward; and radiant tubes are used as a heater to indirectly heat the steel strips 1. The reference sign 6 denotes the snout. The reference sign 7 denotes the coating bath. The reference sign 8 denotes the refiner that deoxidizes and dehumidifies the atmosphere gas sucked from the furnace.

Figure 2:
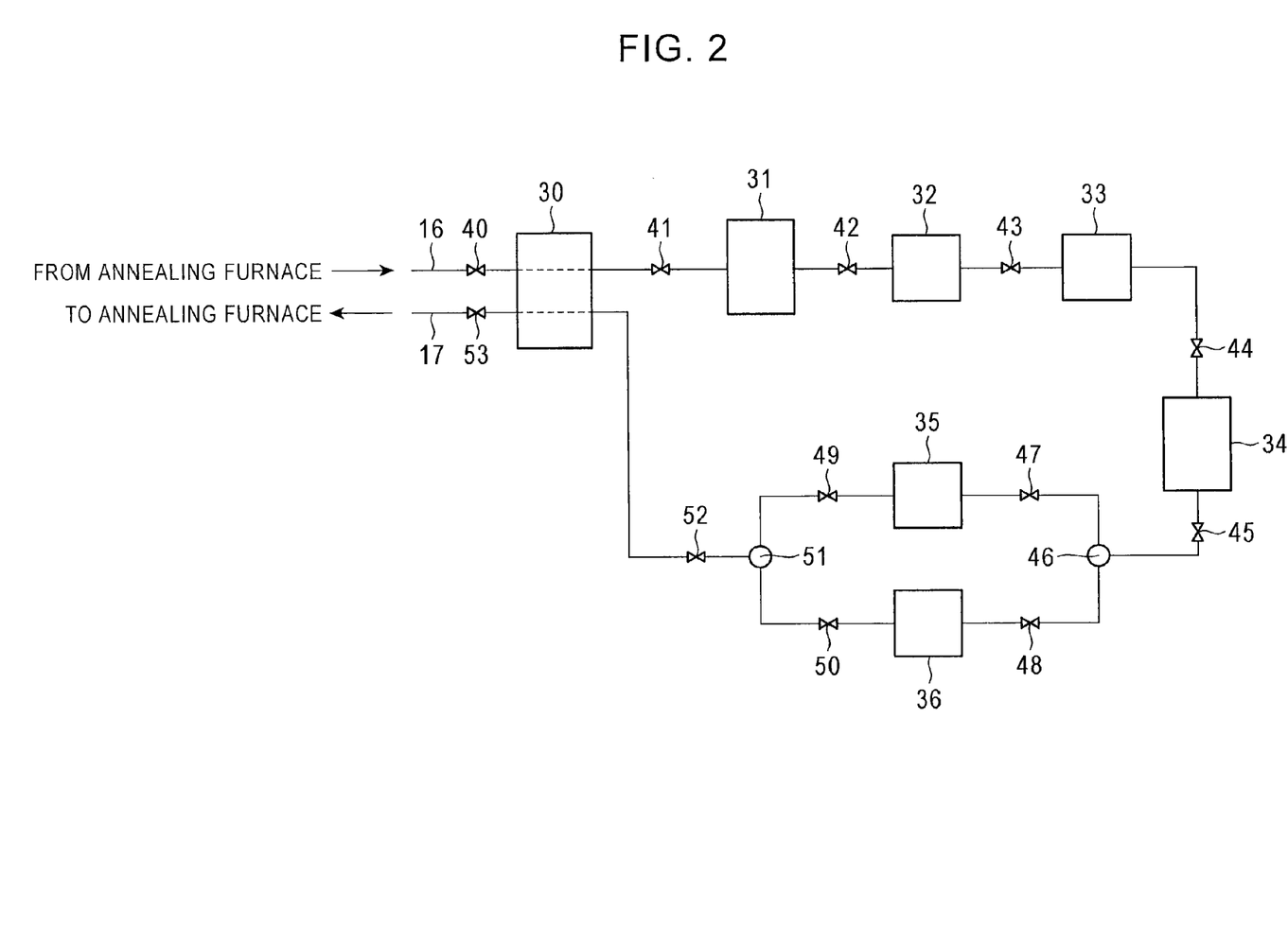
FIG. 2 illustrates an example of the configuration diagram of a refiner.

FIG. 2 illustrates an example of the configuration diagram of the refiner 8. In FIG. 2, the reference sign 30 denotes a heat exchanger; the reference sign 31 denotes a cooler; the reference sign 32 denotes a filter; the reference sign 33 denotes a blower; the reference sign 34 denotes a deoxidation device; the reference signs 35 and 36 denote dehumidification devices; the reference signs 46 and 51 denote selector valves; and the reference signs 40 to 45, 47 to 50, 52, and 53 denote valves. The deoxidation device 34 employs a palladium catalyst. The dehumidification devices 35 and 36 employ a synthetic zeolite catalyst. To continuously perform the operation, the dehumidification devices 35 and 36 are disposed in parallel.

The heating zone 3 and the soaking zone 4 are in communication with each other through the upper portion of the furnace. Except for the communication region in the upper portion of the furnace, a partition wall 12 that separates the atmosphere gas in the heating zone 3 from the atmosphere gas in the soaking zone 4 is disposed. The partition wall 12 is vertically disposed at an intermediate position in the longitudinal direction of the furnace, between a hearth roll at the exit of the heating zone 3 and a hearth roll at the entrance of the soaking zone 4, such that the upper end thereof is located close to the steel strips 1, and the lower end thereof and ends thereof in the steel-strip width direction are in contact with furnace walls.

A connection part 13 between the soaking zone 4 and the cooling zone 5 is disposed in the upper portion of the furnace above the cooling zone 5. In the connection part 13, a roll that downwardly changes the running direction of the steel strips 1 from the soaking zone 4 is disposed. To suppress entry of the atmosphere of the soaking zone 4 into the cooling zone 5 and to suppress entry of radiant heat from the furnace walls of the connection part into the cooling zone 5, the exit of the connection part to the cooling zone 5 is a throat (the cross-sectional area of a portion through which steel strips are passed is small) 14.

The cooling zone 5 is constituted by a first cooling zone 5a and a second cooling zone 5b. Steel strips are passed through the first cooling zone 5a with a single pass.

The reference sign 15 denotes an atmosphere-gas supply system that supplies the atmosphere gas from outside of the furnace into the furnace. The reference sign 16 denotes a gas introduction pipe that introduces the gas into the refiner 8. The reference sign 17 denotes a gas delivery pipe that delivers the gas from the refiner 8.

Adjustment of the supply rates and/or stopping of the atmosphere gas to the furnace regions of the heating zone 3, the soaking zone 4, and the cooling zone 5 and a zone subsequent thereto can be individually performed with valves 15a to 15d and flowmeters 18a to 18c disposed at intermediate positions of the atmosphere-gas supply system 15. In general, the atmosphere gas supplied into the furnace has a composition of 1 to 10 vol % of $H_2$, the balance being $N_2$ and unavoidable impurities, so that the atmosphere gas reduces oxides present in the surfaces of steel strips and the cost of the atmosphere gas is not excessively high. This atmosphere gas has a dew point of about −60° C. In the Description, the term "the cooling zone 5 and a zone subsequent thereto" denotes a region from the cooling zone 5 to the snout 6.

The reference signs 22a and 22b denote atmosphere-gas suction ports. The reference signs 23a to 23c denote atmosphere-gas feed ports. The reference signs 16a to 16c and 17a to 17d denote valves. The reference signs 19a, 19b, and 20a to 20c denote flowmeters. The atmosphere-gas suction ports 22a are disposed in an upper portion of the soaking zone 4. The atmosphere-gas suction ports 22b are disposed in an upper portion of the cooling zone 5 (near the connection part 13 between the soaking zone and the cooling zone). The atmosphere-gas feed ports 23a are disposed in an upper portion of the heating zone 3. The atmosphere-gas feed ports 23b are disposed in a lower portion of the soaking zone 4. The atmosphere-gas feed port 23c is disposed in the connection part 13 between the soaking zone and the cooling zone.

The atmosphere gas sucked through the atmosphere-gas suction ports 22a and 22b is passed through the gas introduction pipe 16 and introduced into the refiner 8. Adjustment of the suction rates and stopping of the atmosphere gas from the furnace through the atmosphere-gas suction ports 22a and 22b can be individually controlled with the valves 16a to 16c and the flowmeters 19a and 19b disposed at intermediate positions of the gas introduction pipe 16.

The gas delivered from the refiner 8 can be passed through the gas delivery pipe 17 and fed into the furnace through the atmosphere-gas feed ports 23a to 23c. The feed rates and stopping of the atmosphere gas through the atmosphere-gas feed ports 23a to 23c into the furnace can be individually controlled with the valves 17a to 17d and the flowmeters 20a to 20c disposed at intermediate positions of the gas delivery pipe 17.

Steel strips are annealed and then hot dip galvanized with the continuous galvanizing line in the following manner. The steel strips 1 are transported through the heating zone 3 and the soaking zone 4 so as to be annealed by heating at a predetermined temperature (for example, about 800° C.) and then cooled to a predetermined temperature in the cooling zone 5. After being cooled, the steel strips 1 are transported through the snout 6 and immersed into the coating bath 7 so as to be hot dip galvanized. After the steel strips 1 are withdrawn from the coating bath, the coating amount is adjusted to be a desired amount with a gas wiping nozzle (not shown) disposed above the coating bath. After the coating amount is adjusted, the zinc coatings may be optionally galvannealed with heating equipment (not shown) disposed above the gas wiping nozzle.

During the operation, the atmosphere gas is supplied through the atmosphere-gas supply system 15 into the furnace. The atmosphere gas may be a standard atmosphere gas in terms of type and composition. The gas may be supplied in a standard manner. The atmosphere gas is generally $H_2$-$N_2$ gas and is supplied to furnace regions of the heating zone 3, the soaking zone 4, and the cooling zone 5 and a zone subsequent thereto.

The atmosphere gas in the upper portion of the soaking zone 4 and the upper portion of the cooling zone 5 is sucked through the atmosphere-gas suction ports 22a and 22b with the blower 33. The sucked atmosphere gas is sequentially passed through the heat exchanger 30 and the cooler 31 so as to be cooled to about 40° C. or less. The atmosphere gas is then cleaned through the filter 32 and subsequently deoxidized with the deoxidation device 34 and dehumidified with the dehumidification device 35 or 36 so that the dew point of the atmosphere gas is decreased to about −60° C. The dehumidification devices 35 and 36 can be selected by operating the selector valves 46 and 51.

The gas whose dew point has been decreased is passed through the heat exchanger 30 and then returned to the upper portion of the heating zone 3, the lower portion of the soaking zone 4, and the connection part 13 between the soaking zone 4 and the cooling zone 5 through the atmosphere-gas feed ports 23a to 23c. By passing the gas whose dew point has been decreased through the heat exchanger 30, the temperature of the gas to be fed into the furnace can be increased.

As described above, the atmosphere-gas suction ports and the atmosphere-gas feed ports are disposed, and the suction rates of the gas through the atmosphere-gas suction ports and the feed rates of the gas through the atmosphere-gas feed ports are properly controlled. Thus, stagnation of the atmosphere gas in the upper portion, middle portion, and lower portion of the furnace in the soaking zone and the former half of the cooling zone can be suppressed and the upper portion of the furnace can be prevented from having a high dew point. As a result, before a normal operation of continuously heat-treating steel strips is performed or when the water concentration and/or oxygen concentration of the atmosphere in the furnace increases during the normal operation, the time over which the dew point of the atmosphere in the furnace is decreased to −30° C. or less at which steel strips can be stably produced by decreasing the water concentration and/or oxygen concentration of the atmosphere in the furnace is shortened to thereby suppress degradation of productivity. In addition, the dew point of the atmosphere in the soaking zone and the connection part between the soaking zone and the cooling zone can be decreased to −40° C. or less, or further −45° C. or less. By further suppressing stagnation of the atmosphere gas in the upper portion, middle portion, and lower portion of the furnace in the latter half of the heating zone, the dew point of the atmosphere in the latter half of the heating zone, the soaking zone, and the connection part between the soaking zone and the cooling zone can be decreased to −45° C. or less, or further −50° C. or less.

Hereinafter, reasons for the limitations in the present invention will be described.

As described above, in CGL, the gas in the furnace flows from a downstream portion to an upstream portion of the furnace. The reasons for the limitations in the present invention are readily understood when sequentially described from the upstream portion of the gas flow. Accordingly, the reasons for the limitations will be sequentially described from the cooling zone, which is located in the upstream portion of the gas flow.

[1] Gas Flow Relating to the Former Half of the Cooling Zone

The gas flow relating to the former half of the cooling zone is defined by a supply rate Qf1 ($Nm^3$/hr, inflow) of the atmosphere gas from outside of the furnace into the cooling zone and a zone subsequent thereto in the furnace and a gas suction rate Qo1 ($Nm^3$/hr, outflow) in the portion of the cooling zone near the connection part between the soaking zone and the cooling zone.

To suppress stagnation of the atmosphere gas and to decrease the dew point of the atmosphere in the former half of the cooling zone, it is necessary to dispose a connection part between the soaking zone and the cooling zone in the upper portion of the furnace, to dispose a gas suction port, in an upper portion of the cooling zone, through which the gas is sucked so as to be introduced into a refiner, and to suck a large portion of the atmosphere gas supplied to the cooling zone and a zone subsequent thereto through the gas suction port in the upper portion of the cooling zone. To decrease the dew point of atmosphere in the connection part between the soaking zone and the cooling zone to −40° C. or less, the gas suction rate Qo1 in the portion of the cooling zone near the connection part between the soaking zone and the cooling zone and the supply rate Qf1 of the atmosphere gas from outside of the furnace into the cooling zone and a zone subsequent thereto in the furnace need to satisfy a relationship represented by a formula (1)

$$0.3 \times Qf1 < Qo1 \tag{1}$$

This is because, when the gas suction rate Qo1 in the portion of the cooling zone near the connection part between the soaking zone and the cooling zone is 0.3 times or less the supply rate Qf1 of the atmosphere gas from outside of the furnace into the cooling zone and a zone subsequent thereto in the furnace, the gas having a high dew point in the former half of the cooling zone is not sufficiently sucked and the dew point of the connection part between the soaking zone and the cooling zone cannot be made −40° C. or less.

When the formula (1) is satisfied, the gas in the cooling zone and a zone subsequent thereto flows from the downstream portion of the cooling zone to an upper portion of the soaking zone close to the connection part between the soaking zone and the cooling zone, and is introduced into the refiner through the atmosphere-gas suction port. A gas made to have a low dew point with the refiner and fed to the connection part between the soaking zone and the cooling zone flows into the upper portion of the cooling zone. As a result, the connection part between the soaking zone and the cooling zone can be made to have a low dew point.

To further decrease the dew point of the connection part between the soaking zone and the cooling zone, the gas suction rate Qo1 in the portion of the cooling zone near the connection part between the soaking zone and the cooling zone and the supply rate Qf1 of the atmosphere gas from outside of the furnace into the cooling zone and a zone subsequent thereto in the furnace preferably satisfy a formula (5), more preferably a relationship represented by a formula (9)

$$0.5 \times Qf1 < Qo1 \tag{5}$$

$$0.7 \times Qf1 < Qo1 \tag{9}$$

[2] Gas Flow Relating to the Soaking Zone

The gas flow relating to the soaking zone is defined by the flow rate Qf1+Qi1−Qo1 of a gas flowing from the cooling zone into the soaking zone, a supply rate Qf2 (inflow) of the atmosphere gas from outside of the furnace into the soaking zone, a gas suction rate Qo2 (outflow) in the upper portion of the soaking zone, and a gas feed rate Qi2 (inflow) in the lower portion of the soaking zone. For the same reasons as in the cooling zone in [1], Qf1 (Nm$^3$/hr)+Qi1 (Nm$^3$/hr)−Qo1 (Nm$^3$/hr), Qf2 (Nm$^3$/hr), Qo2 (Nm$^3$/hr), and Qi2 (Nm$^3$/hr) need to satisfy a relationship represented by a formula (2). Qi1 is a gas feed rate in the connection part between the soaking zone and the cooling zone (described below).

$$0.5 \times (Qf2+Qi2+Qf1+Qi1-Qo1) < Qo2 < Qf2+Qi2+Qf1+Qi1-Qo1 \tag{2}$$

When the gas suction rate Qo2 in the upper portion of the soaking zone is 0.5 times or less the flow rate Qf2+Qi2+Qf1+Qi1−Qo1 of the gas flowing into the upper portion of the soaking zone, the gas having a high dew point in the soaking zone is not sufficiently sucked and the effect of decreasing the dew point is limited. When the gas suction rate Qo2 in the upper portion of the soaking zone is equal to or more than the flow rate Qf2+Qi2+Qf1+Qi1−Qo1 of the gas flowing into the upper portion of the soaking zone, the pressure of the upper portion of the soaking zone becomes a negative pressure and the probability of sucking the air from the outside increases, which is not preferable. When the formula (2) is satisfied, in the soaking zone, the gas that has been deoxidized and dehumidified with the refiner and has a low dew point is fed to a lower portion of the soaking zone; and the gas flows from the lower portion to the upper portion, through the communication region in the upper portion of the furnace to the heating zone. As a result, the problem that the upper portion of the furnace in the soaking zone has a high dew point has been overcome and the soaking zone has an atmosphere having a low dew point of −40° C. or less.

[3] Gas Feed Rate Qi1 in the Connection Part Between the Soaking Zone and the Cooling Zone To make the dew point of the soaking zone −40° C. or less, the gas suction rate Qo1 in the portion of the cooling zone near the connection part between the soaking zone and the cooling zone needs to satisfy a relationship represented by a formula (3).

$$Qi1 > Qo1 - 0.8 \times Qf1 \tag{3}$$

The formula (3) defines the lower limit of the feed rate in the connection part between the soaking zone and the cooling zone. This formula can be converted to Qf1−Qo1+Qi1>0.2× Qf1. Qf1−Qo1+Qi1 on the left side represents the net flow rate of the gas flowing from the connection part between the soaking zone and the cooling zone into the soaking zone. Unless the formula (3) is satisfied, the gas flow from the connection part between the soaking zone and the cooling zone into the soaking zone becomes weak and the gas flow from the soaking zone to the cooling zone becomes relatively strong. Accordingly, a smooth flow in one direction is not maintained and, as in the case where stagnation occurs, the dew point of a portion near the soaking zone becomes high and the dew point of the soaking zone cannot be stably maintained at −40° C. or less. To decrease the dew point of the soaking zone, it is more preferable that the gas feed rate Qi1 of feed ports in the connection part between the soaking zone and the cooling zone satisfy a relationship represented by a formula (6).

$$Qi1 > Qo1 - 0.5 \times Qf1 \tag{6}$$

[4] Gas Feed Rate Qi2 in the Lower Portion of the Soaking Zone

A gas feed rate Qi2 (Nm$^3$/hr) in the lower portion of the soaking zone, an internal volume Vs (m$^3$) of the soaking zone, and an average furnace temperature Ts (° C.) of the soaking zone need to satisfy a relationship represented by a formula (4). The formula (4) defines the lower limit of the gas feed rate Qi2 (Nm$^3$/hr) in the lower portion of the soaking zone. 273/(273+T) is a conversion formula for converting a volume in the standard conditions into a volume at an actual furnace temperature. Unless Qi2 satisfies the relationship represented by the formula (4), the gas flow from the lower portion to the upper portion of the soaking zone becomes weak and the effect of purging a stagnant gas that is present from the lower portion to the upper portion of the furnace and has a high dew point is not sufficiently exhibited. Accordingly, the dew point of the soaking zone cannot be made −40° C. or less. To further decrease the dew point of the soaking zone, Qi2 preferably satisfies a relationship represented by a formula (7), more preferably a relationship represented by a formula (10).

$$Qi2 > 5 \times Vs \times 273/(273+Ts) \tag{4}$$

$$Qi2 > 6 \times Vs \times 273/(273+Ts) \tag{7}$$

$$Qi2 > 7 \times Vs \times 273/(273+Ts) \tag{10}$$

[5] Gas Feed Rate Qi3 of the Feed Port in the Upper Portion of the Heating Zone

To decrease the dew point of the heating zone, a gas feed rate Qi3 (Nm$^3$/hr) of a feed port in the upper portion of the heating zone, an internal volume Vh (m$^3$) of the heating zone, and an average furnace temperature Th (° C.) of the heating zone preferably satisfy a relationship represented by a formula (8), more preferably a relationship represented by a formula (10).

The formula (8) defines the lower limit of the feed flow rate $Qi3$ in the upper portion of the heating zone. $Qi3$ contributes to purging of a stagnant gas having a high dew point in the upper portion of the heating zone. Even when the gas from the refiner is fed to the upper portion of the heating zone, unless the feed formula (8) is satisfied, the stagnant gas having a high dew point in the heating zone cannot be efficiently purged.

$$Qi3 > 0.35 \times Vh \times 273/(273+Th) \qquad (8)$$

When the relationships represented by the formulae (1) to (4) are satisfied, the dew point of the atmosphere in the connection part between the soaking zone and the cooling zone and in the soaking zone can be decreased to −40° C. or less. When the relationships represented by the formulae (5), (2), (6), and (7) are satisfied, the dew point of the atmosphere in the connection part between the soaking zone and the cooling zone and in the soaking zone can be decreased to −45° C. or less. When the relationships represented by the formulae (5), (2), (6), and (7) are satisfied and the relationship represented by the formula (8) is satisfied, the dew point of the atmosphere present from the connection part between the soaking zone and the cooling zone to the latter half of the heating zone can be decreased to −45° C. or less. When the relationships represented by the formulae (9), (2), (6), and (10) are satisfied and the relationship represented by the formula (8) is satisfied, the dew point of the atmosphere present from the connection part between the soaking zone and the cooling zone to the latter half of the heating zone can be decreased to −50° C. or less.

To decrease the dew point, clearly, the higher the flow rate of the gas introduced into the refiner is, the more preferable it is. However, an increase in the gas flow rate requires an increase in the diameter of pipes and the size of the dehumidification and deoxidation equipment, resulting in an increase in the construction costs. Accordingly, it is important to achieve a target dew point with a minimum flow rate.

An example of a method of determining gas flow rates satisfying the formulae will be described below. However, a manner in which the formulae are satisfied in the present invention is not limited to the following description.

The gas flow rates $Qf1$, $Qf2$, and $Qf3$ of the gas supplied into the furnace are first determined. $Qf1$, $Qf2$, and $Qf3$ are not particularly limited and may be, for example, the gas flow rates $Qf1$, $Qf2$, and $Qf3$ of a conventional annealing furnace. After the gas flow rates $Qf1$, $Qf2$, and $Qf3$ are determined, the gas flow rate $Qo1$ can be determined such that the formula (1), or the formula (5) or (9), is satisfied; and the gas flow rate $Qi1$ can be determined such that the formula (3) or the formula (6) is satisfied. The gas flow rates $Qo2$ and $Qi2$ are determined such that the formula (2) is satisfied. The gas flow rate $Qi2$ can be determined such that the formula (4), or the formula (7) or (10), is satisfied on the basis of the internal volume $Vs$ of the soaking zone and the average furnace temperature $Ts$ of the soaking zone. The gas flow rate $Qi3$ can be determined such that the formula (8) is satisfied on the basis of the internal volume $Vh$ of the heating zone and the average furnace temperature $Th$ of the heating zone. In addition, dew points of the portions in the furnace are measured during an operation under the conditions and the gas flow rates in the portions are properly determined again on the basis of the measurement results. As a result, a target dew point can be achieved with a lower flow rate.

The gas suction port in the upper portion of the cooling zone is preferably disposed at a position where gas flows are concentrated such as the throat. The gas suction port in the upper portion of the soaking zone is preferably disposed at a position higher than the upper end of the partition wall. The gas feed port in the connection part between the soaking zone and the cooling zone is preferably disposed at a position where the influence of suction by the suction ports is small. This is because, when the gas feed port is disposed at a position where the influence of suction is large, the gas having been made to have a low dew point is immediately sucked through the suction ports and discharged to the outside of the system without being effectively used. The gas feed port in the upper portion of the heating zone is preferably disposed at a position higher than the upper end of the partition wall and directly above the steel-strip entrance or near the position.

Although the gas suction rate ($Qo1+Qo2$) of the gas sucked into the refiner is generally substantially equal to the delivery rate ($Qi1+Qi2+Qi3$) of the refiner, a gas-circulation-system low-dew-point gas (having a dew point of about −60° C.) may be added in the refiner. The annealing furnace may have a pre-heating furnace at the entry side of the heating zone.

An embodiment of the present invention in which CGL is employed has been described so far. However, the present invention is also applicable to continuous annealing line (CAL) in which steel strips are continuously annealed. In the case of CAL, a portion of an atmosphere gas supplied to the cooling zone and a zone subsequent thereto flows to the outside of the furnace from the exit of the annealing furnace and the balance of the atmosphere gas flows to the entrance of the furnace. The present invention can be applied by determining the ratio R of the flow rate of the gas flowing to the entrance of the furnace in the gas supply rate and by considering the ratio R. Specifically, the present invention can be applied by replacing $Qf1$ in the formulae described in the embodiment with $Qf1 \times R$.

Due to the above-described effects, before a normal operation of continuously heat-treating steel strips is performed or when the water concentration and/or oxygen concentration of the atmosphere in the furnace increases during the normal operation, the time over which the dew point of the atmosphere in the furnace is decreased to −30° C. or less at which steel strips can be stably produced by decreasing the water concentration and/or oxygen concentration of the atmosphere in the furnace is shortened to thereby suppress degradation of productivity. In addition, a furnace atmosphere having a low dew point of −40° C. or less in which the problems of generation of pickup defects and damage on furnace walls are less likely to be caused and formation of oxides of elements susceptible to oxidation such as Si and Mn in the steel of steel strips due to concentration of the elements susceptible to oxidation such as Si and Mn in the surfaces of the steel strips during annealing is suppressed can be stably obtained.

EXAMPLE 1

Dew-point measurement tests were performed with an ART (all radiant type) CGL (length of annealing furnace: 400 m, height of furnace in the heating zone and the soaking zone; 23 m) illustrated in FIG. 1. The internal furnace volume of the heating zone was 571 m³ and the internal furnace volume of the soaking zone was 296 m³.

An atmosphere gas was supplied from outside of the furnace, in the soaking zone, at six positions in total in which three positions were arranged in the furnace longitudinal direction at a height of 1 m from the hearth on the drive side and three positions were arranged in the furnace longitudinal direction at a height of 10 m from the hearth on the drive side; and, in the heating zone, at 16 positions in total in which eight positions were arranged in the furnace longitudinal direction at a height of 1 m from the hearth on the drive side and eight positions were arranged in the furnace longitudinal direction at a height of 10 m from the hearth on the drive side. The atmosphere gas supplied had a dew point of −60° C.

Gas feed ports were disposed, in the connection part between the soaking zone and the cooling zone, at two positions on furnace side walls (one for each side), the positions being 1 m below the furnace top and 0.5 m away from the left furnace wall; in the soaking zone, at six positions on furnace side walls (three positions for each side, pitch: 0.8 m), the positions being arranged 2 m above the furnace bottom such that the center thereof was located at the center of the soaking zone in the furnace longitudinal direction; and, in the heating zone, at four positions (two positions for each side, pitch: 1 m), the positions being arranged such that the center thereof was located at a position 2 m below the furnace top and 2 m away from the right furnace wall.

Gas suction ports were disposed at two positions (one side only) that were 0.1 m below the throat between the cooling zone and the connection part between the soaking zone and the cooling zone and were 0.2 m leftward and rightward from the pass line; and, in the soaking zone, at four positions (two positions for each side), the positions being arranged such that the center thereof was located at a position 3 m below the furnace top and the center of the soaking zone in the furnace longitudinal direction.

In the refiner, a dehumidification device employed synthetic zeolite and a deoxidation device employed a palladium catalyst.

The tests were performed under conditions as uniform as possible in which steel strips having a thickness of 0.8 to 1.2 mm and a width of 950 to 1000 mm were used, the annealing temperature was 800° C., and the steel strips were passed at a rate of 100 to 120 mpm.

An atmosphere gas supplied from the outside of the furnace was $H_2$-$N_2$ gas ($H_2$ concentration: 10 vol %, dew point: −60° C.). Dew points after the refiner had been used for an hour were measured with reference to dew points (initial dew points, −34° C. to −36° C.) of the atmosphere in the base where the refiner was not used. The alloy composition of the steel strips is described in Table 1.

TABLE 1

| C | Si | Mn | S | (mass %) Al |
|---|---|---|---|---|
| 0.12 | 1.3 | 2.0 | 0.003 | 0.03 |

The relationships between the refiner conditions and the like and the dew points under the above-described conditions are described in Table 2. The dew points were measured in the connection part between the cooling zone and the soaking zone (dew point 1), the upper portion of the soaking zone (dew point 2), and the upper portion of the heating zone (dew point 3) (each of the dew points was measured at a position that was 2 m below the furnace top and the center position of the corresponding zone in the furnace longitudinal direction).

TABLE 2

| No. | Supply rate of atmosphere gas into cooling zone and subsequent thereto Qf1 Nm³/hr | Supply rate of atmosphere gas into lower portion of soaking zone Qf2 Nm³/hr | Supply rate of atmosphere gas into lower portion of heating zone Qf3 Nm³/hr | Gas feed rate in connection part between soaking zone and cooling zone Qi1 Nm³/hr | Determination with Formula (3) * | Determination with Formula (6) * | Gas feed rate in lower portion of soaking zone Qi2 Nm³/hr | Determination with Formula (4) * | Determination with Formula (7) * | Determination with Formula (10) * |
|---|---|---|---|---|---|---|---|---|---|---|
| 1 | 300 | 100 | 450 | 0 | Yes | Yes | 0 | No | No | No |
| 2 | 300 | 100 | 450 | 300 | Yes | Yes | 1000 | Yes | Yes | Yes |
| 3 | 300 | 100 | 450 | 200 | Yes | Yes | 1000 | Yes | Yes | Yes |
| 4 | 300 | 100 | 450 | 200 | Yes | Yes | 1000 | Yes | Yes | Yes |
| 5 | 300 | 100 | 450 | 200 | Yes | Yes | 1000 | Yes | Yes | Yes |
| 6 | 300 | 100 | 450 | 150 | Yes | No | 1000 | Yes | Yes | Yes |
| 7 | 300 | 100 | 450 | 100 | Yes | No | 1000 | Yes | Yes | Yes |
| 8 | 300 | 100 | 450 | 50 | No | No | 1000 | Yes | Yes | Yes |
| 9 | 300 | 100 | 450 | 0 | No | No | 1000 | Yes | Yes | Yes |
| 10 | 300 | 100 | 450 | 300 | Yes | Yes | 800 | Yes | Yes | Yes |
| 11 | 300 | 100 | 450 | 300 | Yes | Yes | 600 | Yes | Yes | Yes |
| 12 | 300 | 100 | 450 | 300 | Yes | Yes | 500 | Yes | Yes | Yes |
| 13 | 300 | 100 | 450 | 300 | Yes | Yes | 450 | Yes | Yes | Yes |
| 14 | 300 | 100 | 450 | 300 | Yes | Yes | 450 | Yes | Yes | Yes |
| 15 | 300 | 100 | 450 | 300 | Yes | Yes | 400 | Yes | Yes | Yes |
| 16 | 300 | 100 | 450 | 300 | Yes | Yes | 400 | Yes | Yes | Yes |
| 17 | 300 | 100 | 450 | 300 | Yes | Yes | 350 | Yes | Yes | Yes |
| 18 | 300 | 100 | 450 | 300 | Yes | Yes | 0 | No | No | No |
| 19 | 300 | 100 | 450 | 300 | Yes | Yes | 1000 | Yes | Yes | Yes |
| 20 | 300 | 100 | 450 | 300 | Yes | Yes | 1000 | Yes | Yes | Yes |
| 21 | 300 | 100 | 450 | 300 | Yes | Yes | 1000 | Yes | Yes | Yes |
| 22 | 300 | 100 | 450 | 300 | Yes | Yes | 1000 | Yes | Yes | Yes |
| 23 | 300 | 100 | 450 | 300 | Yes | Yes | 1000 | Yes | Yes | Yes |
| 24 | 300 | 100 | 450 | 300 | Yes | Yes | 1000 | Yes | Yes | Yes |
| 25 | 300 | 100 | 450 | 300 | Yes | Yes | 1000 | Yes | Yes | Yes |
| 26 | 300 | 100 | 450 | 300 | Yes | Yes | 1000 | Yes | Yes | Yes |
| 27 | 300 | 100 | 450 | 300 | Yes | Yes | 1000 | Yes | Yes | Yes |
| 28 | 300 | 100 | 450 | 300 | Yes | Yes | 1000 | Yes | Yes | Yes |
| 29 | 300 | 100 | 450 | 300 | Yes | Yes | 1000 | Yes | Yes | Yes |

TABLE 2-continued

| No. | | | | | | | | | | | |
|---|---|---|---|---|---|---|---|---|---|---|---|
| 30 | 300 | 100 | 450 | 300 | Yes | Yes | 1000 | Yes | Yes | Yes | |
| 31 | 200 | 100 | 450 | 300 | Yes | Yes | 1000 | Yes | Yes | Yes | |
| 32 | 300 | 0 | 450 | 300 | Yes | Yes | 1000 | Yes | Yes | Yes | |
| 33 | 300 | 100 | 0 | 300 | Yes | Yes | 1000 | Yes | Yes | Yes | |

| | Gas feed rate in upper portion of heating zone | | Gas suction rate in upper portion of cooling zone | | | | Gas suction rate in upper portion of soaking zone | | | |
|---|---|---|---|---|---|---|---|---|---|---|
| No. | $Qi3$ Nm³/hr | Determination with Formula (8) * | $Qo1$ Nm³/hr | Determination with Formula (1) * | Determination with Formula (5) * | Determination with Formula (9) * | $Qo2$ Nm³/hr | Determination of lower limit with Formula (2) * | Determination of upper limit with Formula (2) * | Determination with Formula (2) * |
| 1 | 0 | No | 0 | No | No | No | 0 | No | Yes | No |
| 2 | 200 | Yes | 300 | Yes | Yes | Yes | 1200 | Yes | Yes | Yes |
| 3 | 200 | Yes | 300 | Yes | Yes | Yes | 1100 | Yes | Yes | Yes |
| 4 | 40 | Yes | 300 | Yes | Yes | Yes | 940 | Yes | Yes | Yes |
| 5 | 0 | No | 300 | Yes | Yes | Yes | 900 | Yes | Yes | Yes |
| 6 | 200 | Yes | 300 | Yes | Yes | Yes | 1050 | Yes | Yes | Yes |
| 7 | 200 | Yes | 300 | Yes | Yes | Yes | 1000 | Yes | Yes | Yes |
| 8 | 200 | Yes | 300 | Yes | Yes | Yes | 950 | Yes | Yes | Yes |
| 9 | 200 | Yes | 300 | Yes | Yes | Yes | 900 | Yes | Yes | Yes |
| 10 | 200 | Yes | 300 | Yes | Yes | Yes | 1000 | Yes | Yes | Yes |
| 11 | 200 | Yes | 300 | Yes | Yes | Yes | 800 | Yes | Yes | Yes |
| 12 | 200 | Yes | 300 | Yes | Yes | Yes | 700 | Yes | Yes | Yes |
| 13 | 200 | Yes | 300 | Yes | Yes | Yes | 650 | Yes | Yes | Yes |
| 14 | 0 | No | 300 | Yes | Yes | Yes | 450 | Yes | Yes | Yes |
| 15 | 0 | No | 300 | Yes | Yes | Yes | 400 | No | Yes | No |
| 16 | 0 | No | 200 | Yes | Yes | No | 500 | Yes | Yes | Yes |
| 17 | 0 | No | 300 | Yes | Yes | Yes | 350 | No | Yes | No |
| 18 | 200 | Yes | 300 | Yes | Yes | Yes | 200 | No | Yes | No |
| 19 | 100 | Yes | 300 | Yes | Yes | Yes | 1100 | Yes | Yes | Yes |
| 20 | 50 | Yes | 300 | Yes | Yes | Yes | 1050 | Yes | Yes | Yes |
| 21 | 0 | No | 300 | Yes | Yes | Yes | 1000 | Yes | Yes | Yes |
| 22 | 200 | Yes | 200 | Yes | Yes | No | 1300 | Yes | Yes | Yes |
| 23 | 200 | Yes | 170 | Yes | Yes | No | 1330 | Yes | Yes | Yes |
| 24 | 200 | Yes | 150 | Yes | Yes | No | 1350 | Yes | Yes | Yes |
| 25 | 200 | Yes | 100 | Yes | No | No | 1400 | Yes | Yes | Yes |
| 26 | 0 | No | 100 | Yes | No | No | 1200 | Yes | Yes | Yes |
| 27 | 200 | Yes | 50 | No | No | No | 1450 | Yes | Yes | Yes |
| 28 | 200 | Yes | 0 | No | No | No | 1500 | Yes | Yes | Yes |
| 29 | 0 | No | 0 | No | No | No | 1300 | Yes | Yes | Yes |
| 30 | 200 | Yes | 400 | Yes | Yes | Yes | 1100 | Yes | Yes | Yes |
| 31 | 200 | Yes | 300 | Yes | Yes | Yes | 1200 | Yes | Yes | Yes |
| 32 | 200 | Yes | 300 | Yes | Yes | Yes | 1200 | Yes | Yes | Yes |
| 33 | 200 | Yes | 300 | Yes | Yes | Yes | 1200 | Yes | Yes | Yes |

| No. | Dew point 1 Upper portion of cooling zone °C. | Dew point 2 Upper portion of soaking zone °C. | Dew point 3 Upper portion of heating zone °C. | Remark |
|---|---|---|---|---|
| 1 | −35.2 | −34.3 | −36.0 | Base |
| 2 | −52.1 | −51.3 | −52.8 | Optimal case |
| 3 | −50.2 | −50.7 | −52.4 | Feed rate in cooling zone changed |
| 4 | −49.0 | −46.6 | −43.7 | Feed rate in cooling zone changed |
| 5 | −48.1 | −45.5 | −41.1 | Feed rate in cooling zone changed |
| 6 | −44.0 | −48.3 | −51.0 | Feed rate in cooling zone changed |
| 7 | −41.6 | −46.1 | −50.1 | Feed rate in cooling zone changed |
| 8 | −39.2 | −45.2 | −48.9 | Feed rate in cooling zone changed Out of the scope of the present invention |
| 9 | −39.1 | −43.9 | −48.1 | Feed rate in cooling zone changed Out of the scope of the present invention |
| 10 | −52.1 | −51.1 | −52.8 | Feed rate in soaking zone changed |
| 11 | −51.9 | −50.8 | −52.5 | Feed rate in soaking zone changed |

TABLE 2-continued

| | | | | |
|---|---|---|---|---|
| 12 | −50.5 | −48.2 | −50.9 | Feed rate in soaking zone changed |
| 13 | −48.4 | −44.4 | −48.2 | Feed rate in soaking zone changed |
| 14 | −45.1 | −40.5 | −39.0 | Feed rate in soaking zone changed |
| 15 | −44.8 | −39.1 | −38.7 | Feed rate in soaking zone changed Out of the scope of the present invention |
| 16 | −44.4 | −41.0 | −39.9 | Feed rate in soaking zone changed |
| 17 | −44.0 | −38.9 | −38.5 | Feed rate in soaking zone changed Out of the scope of the present invention |
| 18 | −44.1 | −39.0 | −43.3 | Feed rate in soaking zone changed Out of the scope of the present invention |
| 19 | −51.6 | −50.5 | −50.2 | Feed rate in heating zone changed |
| 20 | −50.2 | −49.2 | −44.4 | Feed rate in heating zone changed |
| 21 | −49.6 | −47.0 | −41.5 | Feed rate in heating zone changed |
| 22 | −47.4 | −51.1 | −52.8 | Suction rate in cooling zone changed |
| 23 | −45.9 | −49.6 | −51.6 | Suction rate in cooling zone changed |
| 24 | −45.1 | −48.9 | −50.5 | Suction rate in cooling zone changed |
| 25 | −42.3 | −47.8 | −50.2 | Suction rate in cooling zone changed |
| 26 | −40.3 | −46.7 | −42.0 | Suction rate in cooling zone changed |
| 27 | −39.1 | −47.3 | −49.9 | Suction rate in cooling zone changed Out of the scope of the present invention |
| 28 | −37.8 | −46.9 | −49.6 | Suction rate in cooling zone changed Out of the scope of the present invention |
| 29 | −37.1 | −43.8 | −41.4 | Suction rate in cooling zone changed Out of the scope of the present invention |
| 30 | −51.5 | −50.6 | −52.5 | Suction rate in cooling zone changed |
| 31 | −52.3 | −51.2 | −52.7 | Supply gas in cooling zone changed |
| 32 | −52.3 | −51.1 | −52.6 | Supply gas in soaking zone changed |
| 33 | −51.8 | −50.3 | −50.6 | Supply gas in heating zone changed |

In the cases where the relationships represented by the formulae (1) to (4) are satisfied, dew points of −40° C. or less are achieved in the soaking zone and the connection part between the soaking zone and the cooling zone after the refiner has been used for an hour. In the cases where Qo1, Qi1, and Qi2 further satisfy the relationships represented by the formulae (5), (6), and (7), dew points of −45° C. or less are achieved in the soaking zone and the connection part between the soaking zone and the cooling zone after the refiner has been used for an hour. In the cases where the relationships represented by the formulae (2), (5), (6), and (7) are satisfied and the relationship represented by the formula (8) is satisfied, dew points of −45° C. or less are achieved in the upper portion of the heating zone, the soaking zone, and the connection part between the soaking zone and the cooling zone after the refiner has been used for an hour. In the cases where the relationships represented by the formulae (2), (6), (7), and (9) are satisfied and the relationship represented by the formula (8) is satisfied, dew points of −45° C. or less are achieved in the upper portion of the heating zone, the soaking zone, and the connection part between the soaking zone and the cooling zone after the refiner has been used for an hour.

Although the positions of the gas feed ports and the gas suction ports may be changed from the above-described positions in view of, for example, installations in the furnace, significant changes results in degradation of the advantages. From the flow analysis results, changes of the ports in the height direction from the above-described positions are preferably within 1/6 of the furnace height. For example, in the soaking zone, change of the position in the height direction is preferably by 23/6=3.8 m or less.

EXAMPLE 2

The trend of a decrease in a dew point was investigated with the ART (all radiant type) CGL used in EXAMPLE 1 and illustrated in FIG. 1.

The test conditions of a conventional method (without using refiners) were as follows. The atmosphere gas (dew point: −60° C.) supplied into the furnace had a composition of 8% $H_2$, the balance being $N_2$ and unavoidable impurities. As for the flow rates, Qf1 was 300 $Nm^3$/hr, Qf2 was 100 $Nm^3$/hr, and Qf3 was 450 $Nm^3$/hr. Steel strips (steel had the same alloy composition as in Table 1) having a thickness of 0.8 to 1.2 mm and a width of 950 to 1000 mm were used. The annealing temperature was 800° C. The steel strips were passed at a rate of 100 to 120 mpm.

The test conditions according to a method of the present invention were similar to the above-described conditions, but a refiner was used and, as for the flow rates, Qf1 was 300 $Nm^3$/hr, Qf2 was 100 $Nm^3$/hr, Qf3 was 450 $Nm^3$/hr, Qi1 was 300 $Nm^3$/hr, Qi2 was 1000 $Nm^3$/hr, and Qi3 was 200 $Nm^3$/hr.

Figure 3:
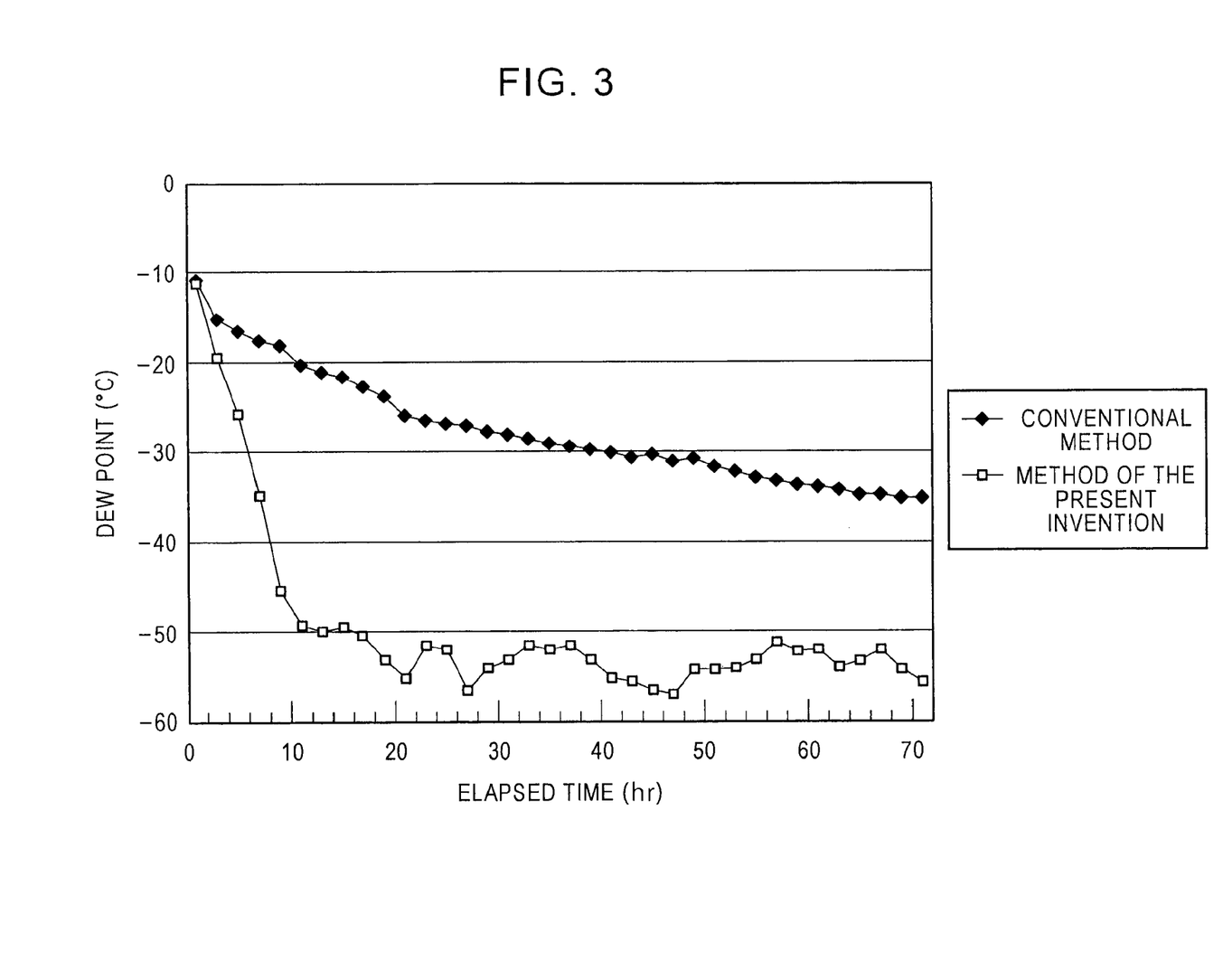
FIG. 3 illustrates trends of a decrease in the dew point in annealing furnaces.

The investigation results are illustrated in FIG. 3. The dew point is the dew point in the upper portion of the soaking zone.

In the conventional method, it took about 40 hours from the initiation of the test to decrease the dew point to −30° C. or less; and the dew point was not decreased to −35° C. even after 70 hours elapsed. In contrast, in the method according to the present invention, the dew point was decreased to −30° C. or less in 6 hours from the initiation of the test, −40° C. or less in 8 hours from the initiation of the test, and −50° C. or less in 12 hours from the initiation of the test.

[Industrial Applicability]

The present invention is applicable as an annealing method for steel strips by which, before a normal operation of continuously heat-treating steel strips is performed or when the water concentration and/or oxygen concentration of the atmosphere in the furnace increases during the normal operation, the dew point of the atmosphere in the furnace can be decreased in a short period of time to −30° C. or less at which steel strips can be stably produced by decreasing the water concentration and/or oxygen concentration of the atmosphere in the furnace.

The present invention is applicable as a method for annealing a high-strength steel strips containing elements susceptible to oxidation such as Si and Mn, by which the problems of generation of pickup defects and damage on furnace walls are less likely to be caused.

[Reference Signs List]

1 steel strips
2 annealing furnace
3 heating zone
4 soaking zone
5 cooling zone
5a first cooling zone
5b second cooling zone
6 snout
7 coating bath
8 refiner
11 hearth roll
12 partition wall
13 connection part
14 throat
15 atmosphere-gas supply system
16 gas introduction pipe
17 gas delivery pipe
15a to 15c, 16a to 16c, 17a to 17d valves
18a to 18c, 19a, 19b, 20a to 20c flowmeters
22a, 22b atmosphere-gas suction ports
23a to 23c atmosphere-gas feed ports
30 heat exchanger
31 cooler
32 filter
33 blower
34 deoxidation device
35, 36 dehumidification devices
46, 51 selector valves
40 to 45, 47 to 50, 52, 53 valves

The invention claimed is:

1. A continuous annealing method for steel strips, comprising annealing steel strips with a vertical annealing furnace in which a heating zone for heating the steel strips while the steel strips are being transported upward and downward, a soaking zone, and a cooling zone are disposed in this order;

wherein an atmosphere gas is supplied from outside of the furnace into the furnace;

wherein a gas in the furnace is discharged from a steel-strip entrance in a lower portion of the heating zone;

wherein a portion of the gas in the furnace is sucked and introduced into a refiner that is disposed outside of the furnace and includes a deoxidation device and a dehumidification device to decrease a dew point of the gas through removal of oxygen and water from the gas;

wherein the gas whose dew point has been decreased is returned into the furnace;

wherein the heating zone and the soaking zone are in communication with each other through an upper portion of the furnace;

wherein except for a communication region in the upper portion of the furnace, a partition wall is disposed so as to separate an atmosphere of the heating zone from an atmosphere of the soaking zone;

wherein a connection part between the soaking zone and the cooling zone is disposed in the upper portion of the furnace;

wherein suction ports through which the gas in the furnace is sucked so as to be introduced into the refiner are disposed in a portion of the cooling zone near the connection part between the soaking zone and the cooling zone and in an upper portion of the soaking zone;

wherein feed ports through which the gas whose dew point has been decreased with the refiner is fed to the furnace are disposed at least in the connection part between the soaking zone and the cooling zone and in a lower portion of the soaking zone; and wherein a gas suction rate Qo1 ($Nm^3$/hr) in the portion of the cooling zone near the connection part between the soaking zone and the cooling zone, a gas suction rate Qo2 ($Nm^3$/hr) in the upper portion of the soaking zone, a gas feed rate Qi1 ($Nm^3$/hr) in the connection part between the soaking zone and the cooling zone, a gas feed rate Qi2 ($Nm^3$/hr) in the lower portion of the soaking zone, a supply rate Qf1 ($Nm^3$/hr) of the atmosphere gas from outside of the furnace into the cooling zone and a zone subsequent to the cooling zone, a supply rate Qf2 ($Nm^3$/hr) of the atmosphere gas from outside of the furnace into the soaking zone, an internal volume Vs ($m^3$) of the soaking zone, and an average furnace temperature Ts (° C.) of the soaking zone satisfy relationships represented by formulae (1) to (4) below:

$$0.3 \times Qf1 < Qo1 \tag{1}$$

$$0.5 \times (Qf2+Qi2+Qf1+Qi1-Qo1) < Qo2 < Qf2+Qi2+Qf1+Qi1-Qo1 \tag{2}$$

$$Qi1 > Qo1 - 0.8 \times Qf1 \tag{3}$$

$$Qi2 > 5 \times Vs \times 273/(273+Ts) \tag{4}$$

2. The continuous annealing method for steel strips according to claim 1, wherein the steel strips are transported through the cooling zone with a single pass.

3. A hot dip galvanizing method for steel strips, comprising performing continuous annealing by the method according to claim 2, and subsequently performing hot dip galvanizing.

4. The hot dip galvanizing method for steel strips according to claim 3, further comprising, after the hot dip galvanizing, galvannealing the hot dip galvanized steel strip.

5. A hot dip galvanizing method for steel strips, comprising performing continuous annealing by the method according to claim 1, and subsequently performing hot dip galvanizing.

6. The hot dip galvanizing method for steel strips according to claim 5, further comprising, after the hot dip galvanizing, galvannealing the hot dip galvanized steel strip.

7. A continuous annealing method for steel strips, comprising annealing steel strips with a vertical annealing furnace in which a heating zone for heating the steel strips while the steel strips are being transported upward and downward, a soaking zone, and a cooling zone are disposed in this order;
wherein an atmosphere gas is supplied from outside of the furnace into the furnace;
wherein a gas in the furnace is discharged from a steel-strip entrance in a lower portion of the heating zone;
wherein a portion of the gas in the furnace is sucked and introduced into a refiner that is disposed outside of the furnace and includes a deoxidation device and a dehumidification device to decrease a dew point of the gas through removal of oxygen and water from the gas;
wherein the gas whose dew point has been decreased is returned into the furnace;
wherein the heating zone and the soaking zone are in communication with each other through an upper portion of the furnace;
wherein except for a communication region in the upper portion of the furnace, a partition wall is disposed so as to separate an atmosphere of the heating zone from an atmosphere of the soaking zone;
wherein a connection part between the soaking zone and the cooling zone is disposed in the upper portion of the furnace;
wherein suction ports through which the gas in the furnace is sucked so as to be introduced into the refiner are disposed in a portion of the cooling zone near the connection part between the soaking zone and the cooling zone and in an upper portion of the soaking zone;
wherein feed ports through which the gas whose dew point has been decreased with the refiner is fed to the furnace are disposed at least in the connection part between the soaking zone and the cooling zone and in a lower portion of the soaking zone; and
wherein a gas suction rate $Qo1$ (Nm$^3$/hr) in the portion of the cooling zone near the connection part between the soaking zone and the cooling zone, a gas suction rate $Qo2$ (Nm$^3$/hr) in the upper portion of the soaking zone, a gas feed rate $Qi1$ (Nm$^3$/hr) in the connection part between the soaking zone and the cooling zone, a gas feed rate $Qi2$ (Nm$^3$/hr) in the lower portion of the soaking zone, a supply rate $Qf1$ (Nm$^3$/hr) of the atmosphere gas from outside of the furnace into the cooling zone and a zone subsequent to the cooling zone, a supply rate $Qf2$ (Nm$^3$/hr) of the atmosphere gas from outside of the furnace into the soaking zone, an internal volume $Vs$ (m$^3$) of the soaking zone, and an average furnace temperature $Ts$ (° C.) of the soaking zone satisfy relationships represented by formulae (5), (2), (6), and (7) below:

$$0.5 \times Qf1 < Qo1 \quad (5)$$

$$0.5 \times (Qf2+Qi2+Qf1+Qi1-Qo1) < Qo2 < Qf2+Qi2+Qf1+Qi1-Qo1 \quad (2)$$

$$Qi1 > Qo1 - 0.5 \times Qf1 \quad (6)$$

$$Qi2 > 6 \times Vs \times 273/(273+Ts) \quad (7).$$

8. The continuous annealing method for steel strips according to claim 7, wherein another feed port through which the gas whose dew point has been decreased with the refiner is fed to the furnace is disposed in an upper portion of the heating zone; and
wherein a gas feed rate $Qi3$ (Nm$^3$/hr) in the upper portion of the heating zone, an internal volume $Vh$ (m$^3$) of the heating zone, and an average furnace temperature $Th$ (° C.) of the heating zone satisfy a relationship represented by a formula (8) below:

$$Qi3 > 0.35 \times Vh \times 273/(273+Th) \quad (8).$$

9. The continuous annealing method for steel strips according to claim 8, wherein the steel strips are transported through the cooling zone with a single pass.

10. A hot dip galvanizing method for steel strips, comprising performing continuous annealing by the method according to claim 8, and subsequently performing hot dip galvanizing.

11. The hot dip galvanizing method for steel strips according to claim 10, further comprising, after the hot dip galvanizing, galvannealing the hot dip galvanized steel strip.

12. The continuous annealing method for steel strips according to claim 7, wherein the steel strips are transported through the cooling zone with a single pass.

13. A hot dip galvanizing method for steel strips, comprising performing continuous annealing by the method according to claim 7, and subsequently performing hot dip galvanizing.

14. The hot dip galvanizing method for steel strips according to claim 13, further comprising, after the hot dip galvanizing, galvannealing the hot dip galvanized steel strip.

15. A continuous annealing method for steel strips, comprising annealing steel strips with a vertical annealing furnace in which a heating zone for heating the steel strips while the steel strips are being transported upward and downward, a soaking zone, and a cooling zone are disposed in this order;
wherein an atmosphere gas is supplied from outside of the furnace into the furnace;
wherein a gas in the furnace is discharged from a steel-strip entrance in a lower portion of the heating zone;
wherein a portion of the gas in the furnace is sucked and introduced into a refiner that is disposed outside of the furnace and includes a deoxidation device and a dehumidification device to decrease a dew point of the gas through removal of oxygen and water from the gas;
wherein the gas whose dew point has been decreased is returned into the furnace;
wherein the heating zone and the soaking zone are in communication with each other through an upper portion of the furnace;
wherein except for a communication region in the upper portion of the furnace, a partition wall is disposed so as to separate an atmosphere of the heating zone from an atmosphere of the soaking zone;

wherein a connection part between the soaking zone and the cooling zone is disposed in the upper portion of the furnace;

wherein suction ports through which the gas in the furnace is sucked so as to be introduced into the refiner are disposed in a portion of the cooling zone near the connection part between the soaking zone and the cooling zone and in an upper portion of the soaking zone;

wherein feed ports through which the gas whose dew point has been decreased with the refiner is fed to the furnace are disposed at least in the connection part between the soaking zone and the cooling zone and in a lower portion of the soaking zone; and wherein a gas suction rate Qo1 (Nm³/hr) in the portion of the cooling zone near the connection part between the soaking zone and the cooling zone, a gas suction rate Qo2 (Nm³/hr) in the upper portion of the soaking zone, a gas feed rate Qi1 (Nm³/hr) in the connection part between the soaking zone and the cooling zone, a gas feed rate Qi2 (Nm³/hr) in the lower portion of the soaking zone, a supply rate Qf1 (Nm³/hr) of the atmosphere gas from outside of the furnace into the cooling zone and a zone subsequent to the cooling zone, a supply rate Qf2 (Nm³/hr) of the atmosphere gas from outside of the furnace into the soaking zone, an internal volume Vs (m³) of the soaking zone, and an average furnace temperature Ts (° C.) of the soaking zone satisfy relationships represented by formulae (9), (2), (6), and (10) below:

$$0.7 \times Qf1 < Qo1 \tag{9}$$

$$0.5 \times (Qf2+Qi2+Qf1+Qi1-Qo1) < Qo2 < Qf2+Qi2+Qf1+Qi1-Qo1 \tag{2}$$

$$Qi1 > Qo1 - 0.5 \times Qf1 \tag{6}$$

$$Qi2 > 7 \times Vs \times 273/(273+Ts) \tag{10}.$$

16. The continuous annealing method for steel strips according to claim 15, wherein the steel strips are transported through the cooling zone with a single pass.

17. A hot dip galvanizing method for steel strips, comprising performing continuous annealing by the method according to claim 15, and subsequently performing hot dip galvanizing.

18. The hot dip galvanizing method for steel strips according to claim 17, further comprising, after the hot dip galvanizing, galvannealing the hot dip galvanized steel strip.

19. The continuous annealing method for steel strips according to claim 15, wherein another feed port through which the gas whose dew point has been decreased with the refiner is fed to the furnace is disposed in an upper portion of the heating zone; and wherein a gas feed rate Qi3 (Nm³/hr) in the upper portion of the heating zone, an internal volume Vh (m³) of the heating zone, and an average furnace temperature Th (° C.) of the heating zone satisfy a relationship represented by a formula (8) below:

$$Qi3 > 0.35 \times Vh \times 273/(273+Th) \tag{8}.$$

* * * * *